United States Patent
Mewes et al.

(10) Patent No.: US 6,915,982 B2
(45) Date of Patent: Jul. 12, 2005

(54) SINGLE REEL DATA STORAGE TAPE CARTRIDGE WITH INTERNAL TAPE GUIDE

(75) Inventors: Michael A. Mewes, Fargo, ND (US); Michael E. Reard, Fergus Falls, MN (US); Jerome D. Brown, Wahpeton, ND (US); G. Phillip Rambosek, Shafer, MN (US); Geoffrey A. Lauinger, Campbell, MN (US); James L. Albrecht, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/452,332

(22) Filed: Jun. 2, 2003

(65) Prior Publication Data

US 2004/0238670 A1 Dec. 2, 2004

(51) Int. Cl.[7] .................................................. G03B 1/44
(52) U.S. Cl. .................. 242/615.3; 242/348; 242/315.4
(58) Field of Search ................................ 242/346, 348, 242/348.2, 332.4, 566, 548, 615, 615.21, 615.3, 615.4; 360/132

(56) References Cited

U.S. PATENT DOCUMENTS

| | | | | |
|---|---|---|---|---|
| 956,178 A | * | 4/1910 | Ryder | 242/348 |
| 959,601 A | * | 5/1910 | Power | 242/348 |
| 3,804,498 A | * | 4/1974 | Lopata et al. | 242/348 |
| 3,861,611 A | * | 1/1975 | Esashi et al. | 242/346 |
| 5,001,511 A | * | 3/1991 | Katoh et al. | |
| 5,748,290 A | * | 5/1998 | Nakao | 242/348 |
| 5,893,526 A | | 4/1999 | Zwettler | |
| 5,906,324 A | | 5/1999 | Adams et al. | |
| 5,969,913 A | * | 10/1999 | Vanderheyden et al. | 360/132 |
| 6,069,777 A | * | 5/2000 | Vanderheyden et al. | 360/132 |
| 6,246,542 B1 | * | 6/2001 | Hu | 360/132 |
| 6,249,401 B1 | * | 6/2001 | Zwettler | 360/132 |
| 6,343,757 B1 | * | 2/2002 | Zwettler | 242/346 |
| 6,405,957 B1 | | 6/2002 | Alexander et al. | |
| 6,505,788 B1 | * | 1/2003 | Taki et al. | 242/348.2 |
| 6,633,454 B1 | * | 10/2003 | Martin et al. | 360/132 |

* cited by examiner

*Primary Examiner*—William A. Rivera
(74) *Attorney, Agent, or Firm*—Eric D. Levinson

(57) ABSTRACT

A single reel data storage tape cartridge is described that includes a housing having a tape access window. A single tape reel assembly is rotatably disposed within the housing and includes a hub about which a storage tape is wrapped. A tape guide is disposed within the housing adjacent the single tape reel assembly, opposite the tape access window, and is configured to define a pathway of the storage tape from the single tape reel assembly to the tape access window and limit lateral motion of the storage tape.

21 Claims, 6 Drawing Sheets

SINGLE REEL DATA STORAGE TAPE CARTRIDGE WITH INTERNAL TAPE GUIDE

THE FIELD OF THE INVENTION

The present invention generally relates to single reel data storage tape cartridges. More particularly, it relates to single reel data storage tape cartridges incorporating a tape guide for defining a pathway of the storage tape during use.

BACKGROUND OF THE INVENTION

Single reel data storage tape cartridges have been used for decades in the computer, I/O, and video fields. The single reel data storage tape cartridge continues to be an extremely popular form of recording large volumes of information for subsequent retrieval and use.

A single reel data storage tape cartridge generally consists of an outer shell or housing maintaining a single tape reel assembly and a length of magnetic storage tape. The storage tape is wrapped about a hub portion of the single tape reel assembly and is driven through a defined path by a driving system. The housing normally includes a separate cover and base, a combination of which forms a tape access window at a forward portion of the housing. With single reel cartridge designs, a free end of the storage tape is typically secured to a leader block that assists in guiding the storage tape from the housing. During storage, the leader block is selectively retained at the tape access window.

Single reel data storage tape cartridges cooperate with the tape drive in reading and writing data to the storage tape. Generally, upon engagement with the tape drive, the storage tape is directed away from the cartridge housing by internal components of the tape drive. For example, the leader block is configured to be engaged by the tape drive, and the tape drive directs the storage tape into engagement with the read/write head. To this end, the tape drive will separately include various internal guides for defining the desired tape path within the tape drive.

Various inherent design limitations can compromise the desired, precise engagement of the storage tape with the tape drive. For example, the tape reel may contribute to undesired lateral (or edge-to-edge) tape movement. In this regard, the tape reel typically includes a central hub and opposing flanges. The storage tape is wrapped about the central hub and is laterally constrained by the tape reel flanges (i.e., the flanges limit lateral movement of the storage tape by contacting a respective top or bottom edge). However, to minimize wear of the storage tape edges, a slight spacing is maintained between the tape edges and the tape reel flanges. That is to say, an overall lateral spacing between the opposing tape reel flanges is greater than a width of the storage tape, typically on the order of 0.002–0.02 inch. As a result, during tape reel rotation, the storage tape can move laterally from tape reel flange to tape reel flange. For this reason at least, large undesirable lateral tape movement can occur as the storage tape leaves the cartridge.

During use, storage tape from the single reel tape cartridge is pulled off of the tape reel and directed into the tape drive for read/write access. The tape drive is provided with guides inside the tape drive housing to contain and minimize the undesirable lateral movement of the storage tape. As a result, the guides within the tape guiding system experience wear from the moving edges of the storage tape. As the guides in the tape guiding system wear down, lateral movement of the data storage tape increases, contributing to increased reading/writing errors. Further, if the storage tape is slightly above or below an expected location, or datum, the read/write head will experience difficulty in finding a desired data track on the storage tape. Additionally, the read/write head may encounter tracking problems where the head "loses" a desired track. Finally, recent improvements in storage tape media have increased the available track densities on the media, and subsequent lateral movement of the storage tape during the read/write process can result in increased read/write errors.

Single reel data storage tape cartridges are important data storage devices that maintain vast amounts of information. While the evolution of cartridge components, including the storage tape, have greatly improved data storage tape cartridge performance, other problems, including lateral tape movement exist. Therefore, a need exists for a single reel data storage tape cartridge that will define a pathway of the storage tape from the single tape reel assembly to the tape access window that minimizes lateral movement of the storage tape during use.

SUMMARY OF THE INVENTION

One aspect of the present invention relates to a single reel data storage tape cartridge including a housing having a tape access window. A single tape reel assembly is rotatably disposed within the housing and includes a hub about which a storage tape is wrapped. A tape guide is disposed within the housing adjacent to the single tape reel assembly, opposite the tape access window, and defines a pathway of the storage tape from the single tape reel assembly to the tape access window.

Another aspect of the present invention relates to a method of using a single reel data storage tape cartridge and tape drive. The method includes engaging the single reel data storage tape cartridge with the tape drive having a read/write head. Additionally, the single reel data storage tape cartridge includes a housing having a tape access window, a single tape reel assembly rotatably disposed within the housing, the single tape reel assembly including a hub, and a storage tape wound about the hub. The method further includes articulating the storage tape along a tape path defined at least in part by a tape guide disposed within the housing opposite the tape access window. The method additionally includes driving the storage tape through the tape access window and into engagement with the read/write head wherein the tape guide defines a pathway of the storage tape from the tape reel assembly to the tape access window.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
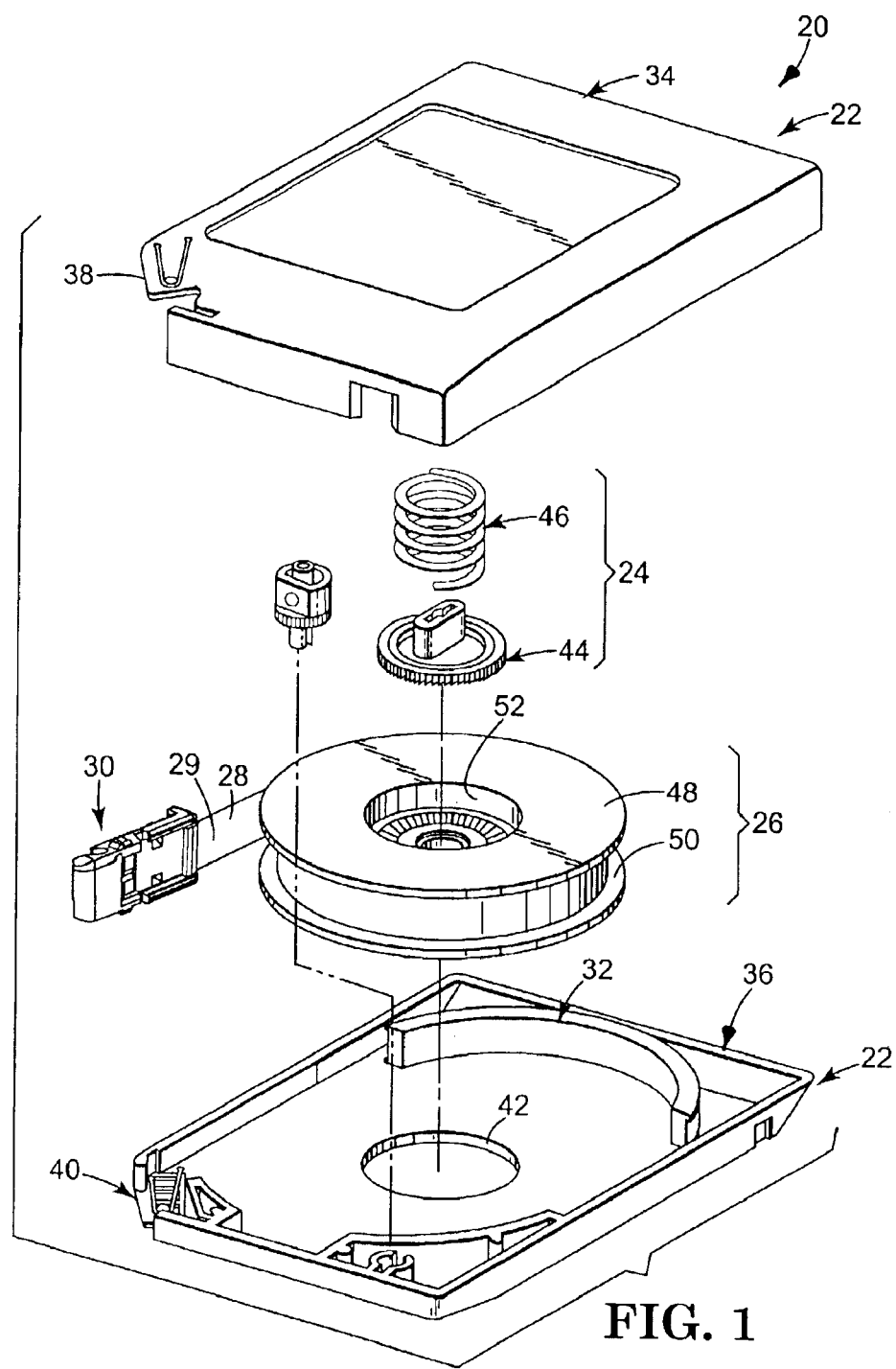
FIG. 1 is a perspective, exploded view of a single reel data storage tape cartridge with a tape guide molded into the base according to one embodiment of the present invention.

A single reel data storage tape cartridge according to one embodiment of the present invention is generally illustrated at 20 in FIG. 1. Generally, the single reel data storage tape cartridge 20 includes a housing 22, a brake assembly 24, a single tape reel assembly 26, a storage tape 28, a leader block 30, and an internal tape guide 32. The single tape reel assembly 26 is disposed within the housing 22. The storage tape 28, in turn, is wound about the single tape reel assembly 26 and includes a leading end 29 attached to the leader block 30.

The housing 22 is sized to be received by a typical tape drive (not shown). Thus, the housing 22 exhibits a size of approximately 125 mm×110 mm×21 mm, although other dimensions are equally acceptable. With this in mind, the housing 22 is defined by a first housing section 34 and a second housing section 36. In one embodiment, the first housing section 34 forms a cover whereas the second housing section 36 forms a base. As used throughout the specification, directional terminology, such as "cover", "base", "upper", "lower", "top", "bottom", etc., are used for purposes of illustration only and are in no way limiting.

The first and second housing sections 34 and 36, respectively, are sized to be reciprocally mated to one another and are generally rectangular, except for one corner 38 that is preferably angled and forms a tape access window 40. The tape access window 40 serves as an opening for the storage tape 28 to exit from the housing 22 such that the storage tape 28 can be threaded to the tape drive (not shown) when the leader block 30 is removed from the tape access window 40. Conversely, when the leader block 30 is engaged in the tape access window 40, the tape access window 40 is covered.

In addition to the tape access window 40, the second housing section 36 further forms a central opening 42. The central opening 42 facilitates access to the single tape reel assembly 26 by a drive chuck portion of the tape drive (not shown).

The brake assembly 24 is of the type known in the art and generally includes a brake 44 and a spring 46. The single tape reel assembly 26 is also a known component and includes an upper flange 48, a lower flange 50, and a ring-shaped hub 52 that is sized to co-axially receive the brake assembly 24. The storage tape 28 is wound about the hub 52, constrained laterally by the tape reel flanges 48 and 50. As is known in the art, the brake 44 and the spring 46 selectively "lock" the single tape reel assembly 26 to the housing 22 when the single reel data storage tape cartridge 20 is not in use. Alternatively, other configurations for the brake assembly 24 and/or the single tape reel assembly 26 are equally acceptable.

The storage tape 28 is preferably a magnetic tape of a type commonly known in the art. For example, the storage tape 28 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., of Oakdale, Minn.

The leader block 30 covers the tape access window 40 and facilitates retrieval of the storage tape 28. In general terms, the leader block 30 is shaped to conform to the window 40 of the housing 22 and to cooperate with the tape drive (not shown) by providing a grasping surface for the tape drive to manipulate in delivering the storage tape 28 to the read/write head. In this regard, the leader block 30 is preferably formed from a rigid material. In one embodiment, the leader block is molded from a glass-filled polycarbonate, although other materials and manufacturing techniques are also acceptable. Further, leader block 30 can be replaced by other known components, such as a dumbbell-shaped pin.

Figure 2:
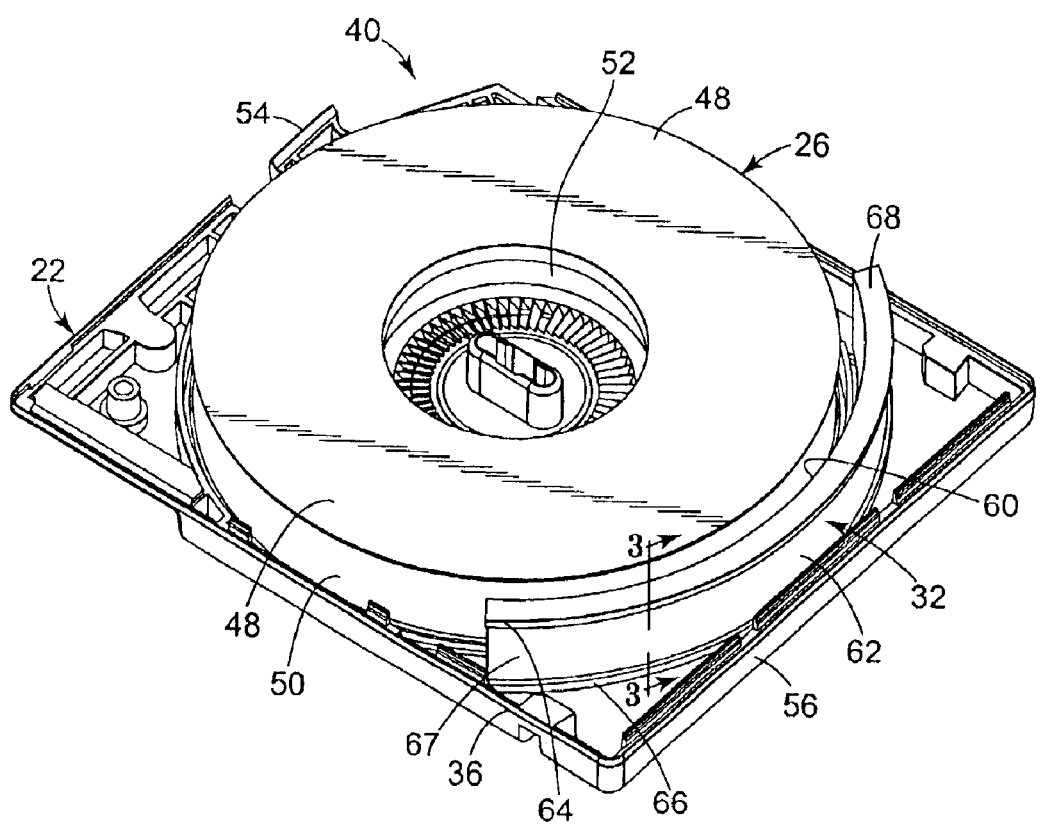
FIG. 2 is a perspective view of a base of a single reel data storage tape cartridge illustrating a molded tape guide adjacent to a tape reel.

In a preferred embodiment, the tape guide 32 is molded into the second housing section 36 opposite the tape access window 40 as illustrated in FIG. 2. In this regard, the housing 22 defines a front wall 54 and a back wall 56. At least a portion of the tape access window 40 is formed in the front wall 54. The tape guide 32 is positioned between the single tape reel assembly 26 and the back wall 56. For ease of illustration, the storage tape 28 is not shown in FIG. 2. The tape guide 32 includes an arcuate back face 60, an arcuate tape contact face 62, a top flange 64 and a bottom flange 66. The arcuate back face 60 curves to conform to the flanges, for example, the upper flange 48, of the single tape reel assembly 26. The tape contact face 62 is also curved. The top and bottom flanges 64 and 66, respectively, project beyond the tape contact face 62 and restrict the lateral movement of the storage tape 28 (FIG. 1) as it moves across the tape guide 32. In this way, the tape contact face 62 forms a portion of the pathway for the moving data storage tape 28. In particular, the tape guide 32 defines the pathway of the storage tape 28 from the single tape reel assembly to the tape access window 40 such that the pathway between the tape guide 32 and the tape access window 40 is constant whether the hub 52 retains many, or few, wraps of storage tape 28.

In one preferred embodiment, the top and bottom flanges 64 and 66, respectively, restrict the lateral motion of the storage tape 28 to less than 300 micrometers, preferably less than 100 micrometers; more preferably lateral motion of the storage tape 28 is restricted to less than 50 micrometers. For example, in one exemplary embodiment, the top and bottom flanges 64 and 66 restrict lateral motion of the storage tape 28 to approximately 20 micrometers.

In a preferred embodiment, the pathway of the storage tape 28 (FIG. 1) is maintained by guiding the storage tape 28 away from the hub 52, to the tape guide 32 and along the tape contact face 62, and finally out of the tape access window 40. For example, the storage tape 28 travels a path from the single tape reel assembly 26 to a first end 67 of the tape guide 32. The storage tape 28 traverses the tape contact face 62 and arrives at a second end 68 of the tape guide 32. The second end 68 is configured to align the pathway of the storage tape 28 with the tape access window 40. Consequently, as the storage tape 28 exits the tape guide 32, the pathway is consistently aligned with the tape access window 40 such that a constant pathway of the storage tape 28 from the tape guide 32 to the tape access window 40 is maintained. As a result, the pathway of the storage tape 28 is maintained such that it does not extend across the tape access window. Lateral movement of the storage tape 28 is minimized by the top flange 64 and the bottom flange 66 to facilitate guiding of the storage tape 28 along the tape guide 32, as better shown in FIG. 3.

Figure 3:
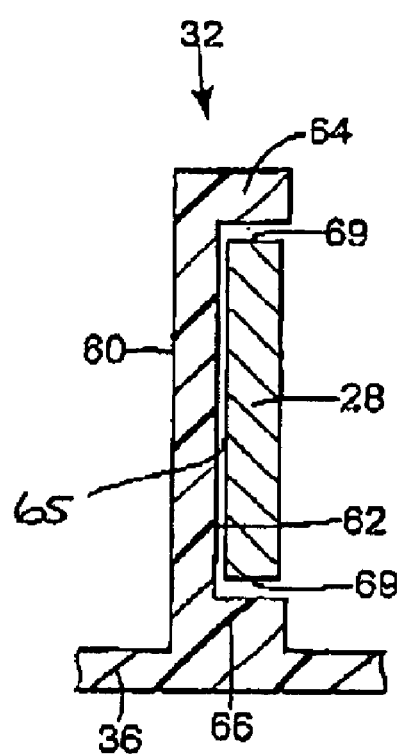
FIG. 3 is a cross-sectional view of the tape guide of FIG. 2.

FIG. 3 illustrates a cross-section of the tape guide 32 of FIG. 2 with a section of storage tape 28 added for descriptive clarity. As depicted, the lateral movement of the storage tape 28 is restricted by the top and bottom flanges 64 and 66, respectively. The top and bottom flanges 64 and 66 are configured to restrict the movement of the storage tape 28 as the storage tape 28 traverses across the tape contact face 62. In particular, the top and bottom flanges 64 and 66 serve as rigid stops to opposing edges 69 of the storage tape 28 that can move laterally. As a result, the tape contact face 62 defines a pathway for the storage tape 28, and the top and bottom flanges 64 and 66 restrict the lateral movement of the edges 69 of the storage tape 28.

In an exemplary embodiment, the tape guide 32 is preferably manufactured from a durable material, such as metal, ceramic, or plastic. Examples of suitable materials for manufacturing the tape guide 32 include aluminum, steel, stainless steel, polyester, nylon and thermoplastic and thermoset plastics in general. The durable material that comprises the tape guide 32 is preferably coated 65 the contacting surfaces to be abrasion resistant. One preferred coating 65 includes an electroless metal coating heat treated to a Rockewell hardness of at least C20.

Figure 4:
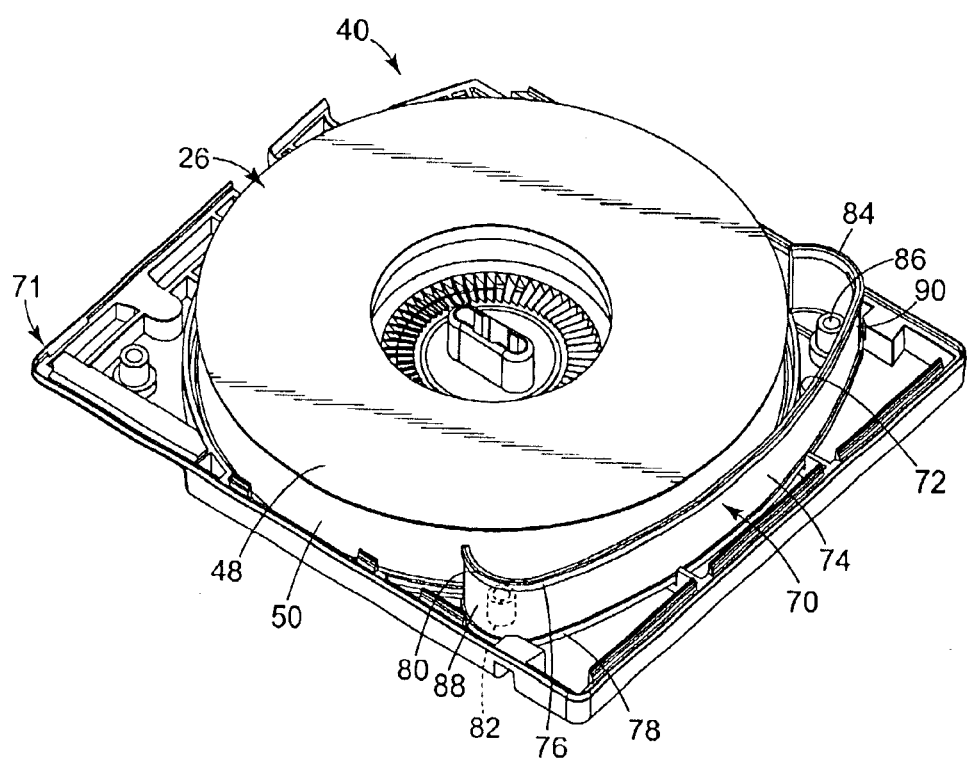
FIG. 4 is a perspective view of a base of a single reel data storage tape cartridge illustrating an insertable tape guide adjacent to a tape reel.

While FIG. 2 illustrates one preferred embodiment of the tape guide 32 formed integrally by the housing 22, in an alternate preferred embodiment an insertable tape guide 70 is formed separately and inserted into a housing 71 as illustrated in FIG. 4. FIG. 4 illustrates various internal components disposed within the housing 71 in a manner highly similar to the positioning of components within housing 22 of FIG. 2. In particular, the single tape reel assembly 26 is disposed within the housing 71 and cooperates with the tape guide 70 that is inserted into the housing 71 opposite the tape access window 40. The tape guide 70 includes an arcuate back face 72 and an arcuate tape contact face 74. The back face 72 is curved to complement the circular shape of the upper flange 48 of the single tape reel assembly 26. The tape contact face 74 is configured to guide the storage tape 28 (FIG. 1) and define a pathway for the storage tape 28 in the direction of the tape access window 40. To promote guiding of the storage tape 28, the tape guide 70 includes a top flange 76 and a bottom flange 78 that restrict the lateral movement of the storage tape 28, as analogously described regarding the cross section of tape guide 32 of FIG. 3. The insertable tape guide 70 is provided with a first engagement end 80 configured to couple around a first screw boss 82 and a second engagement end 84 configured to couple around a second screw boss 86. In this regard, the first engagement end 80 forms a first corner guide 88 and the second engagement end 84 forms a second corner guide 90. Consequently, the tape guide 70 is secured about the two screw bosses 82 and 86 in forming integral corner guides 88 and 90. In particular, as illustrated in FIG. 4, the tape guide 70 defines a pathway of the storage tape 28 from the single tape reel assembly 26 to the tape access window 40 according to one embodiment of the present invention. Specifically, the tape guide 70 defines a constant pathway 92 for the storage tape 28 as it travels into, and out of, the tape access window 40, as better illustrated in FIG. 5.

Figure 5:
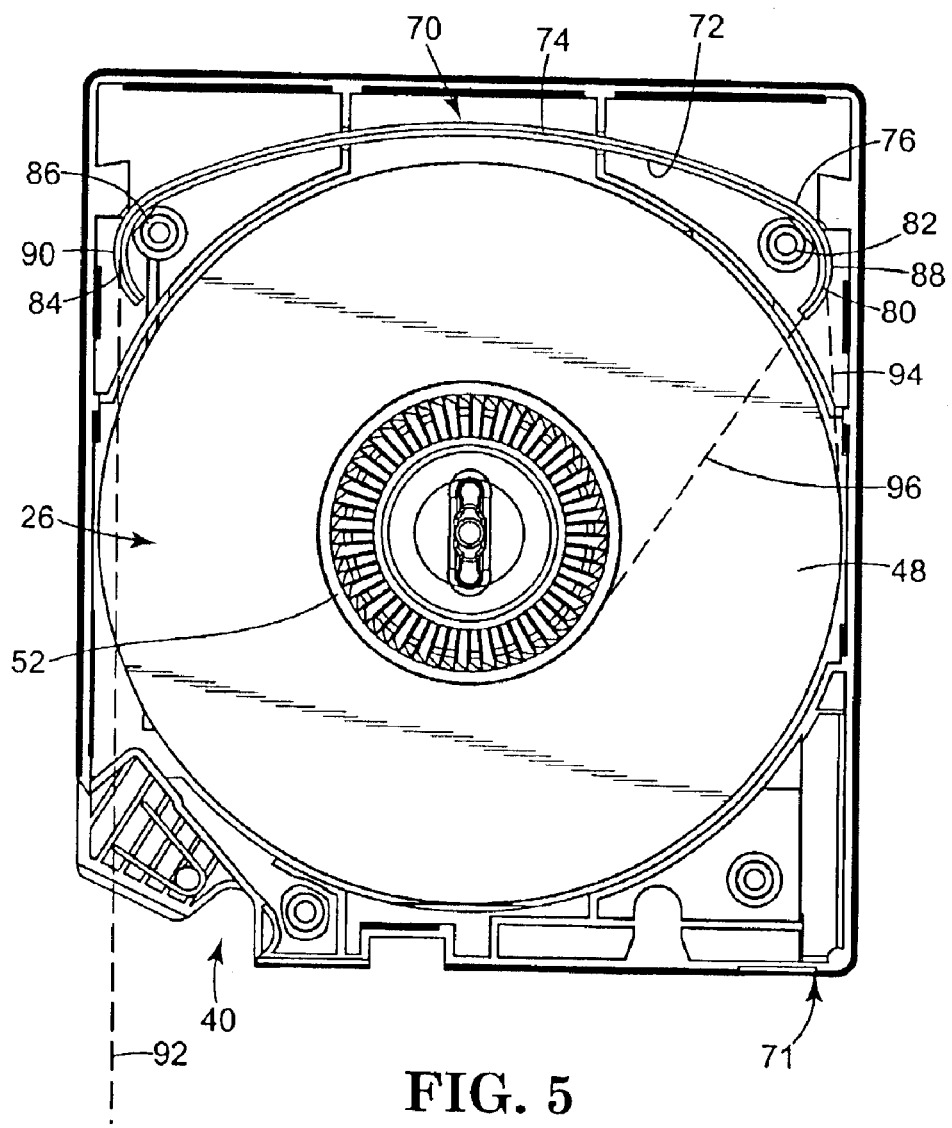
FIG. 5 is a perspective view of a tape guide inserted into a single reel data storage tape cartridge illustrating a constant tape pathway through the tape access window.

The constant pathway 92 of the storage tape 28 as it travels into and out of the tape access window 40 permits consistent storage tape 28 engagement with the tape drive (not shown) and minimizes the read/write errors that are attributable to the lateral movement of the storage tape 28. As shown in FIG. 5, the pathway of the storage tape 28 is represented as a dotted line. The storage tape 28 travels the constant pathway 92 through the tape access window 40 that is maintained whether the hub 52 is filled with storage tape 28 (full tape pathway 94) or the hub 52 is nearly empty of storage tape 28 (empty tape pathway 96). In this regard, the tape guide 70 defines the constant pathway 92 of the storage tape 28 through the tape access window 40.

Figure 6:
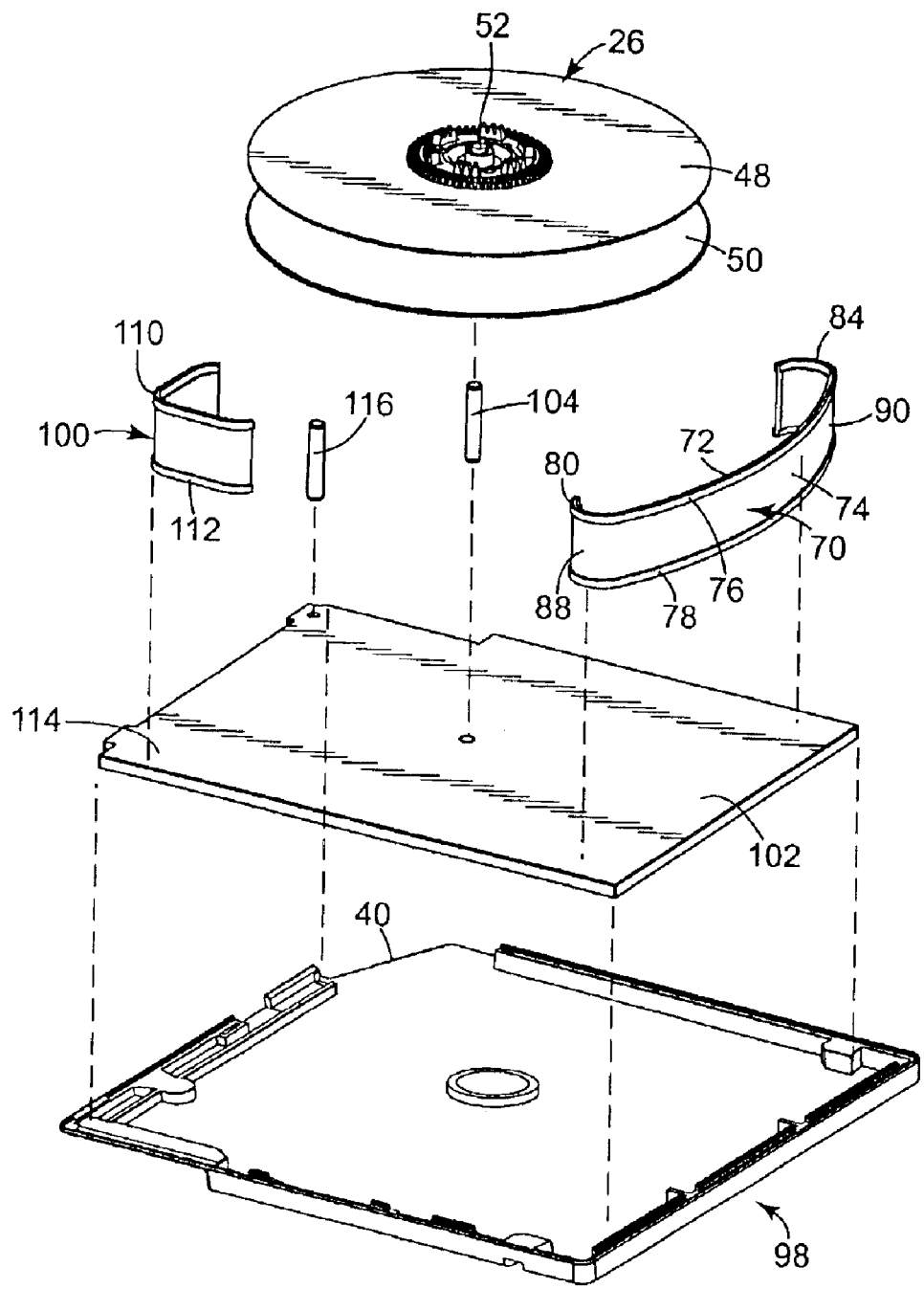
FIG. 6 is a perspective, exploded view of a tape guide, a corner guide, and a tape reel assembly mounted onto a base plate insertable into a single reel data storage tape cartridge housing.

The tape guide 70 can be inserted into the housing 71 subsequent to the fabrication of the housing 71 (FIG. 4), or the tape guide 32 can be molded directly into the housing 22 (FIG. 2) opposite the tape access window 40. In either case, the tape guide 32 or the tape guide 70 defines the pathway (92 and 96, for example) of the storage tape 28 (FIG. 1) from the single tape reel assembly 26 to the tape access window 40. Even so, it can be advantageous to additionally position one or more auxiliary guides within a data storage tape cartridge housing to guide the storage tape 28 to and/or from the tape guide 70 and increase the tape path length. For example, FIG. 6 illustrates an exploded view of a portion of an alternative embodiment single reel tape cartridge 98 provided with the tape guide 70 and an auxiliary guide 100. With the one embodiment of FIG. 6, the auxiliary guide 100 serves as a corner guide, although other forms and/or locations of the auxiliary guide 100 are also acceptable. To facilitate accurate alignment of the tape guide 70 and the supplemental guide 100 relative to the single tape reel assembly 26, a base plate 102 is utilized. A hub pin 104 attaches the single tape reel assembly 26 to the base plate 102. The tape guide 70 and the auxiliary guide 100 are mounted to the base plate 102 by any of the mechanical means known in the art. One advantage of disposing the base plate 102 within the housing 98 is that the single tape reel assembly 26, and hence the storage tape 28, can be accurately placed a known distance, or datum, above a horizontal plane of the base plate 102. As such, the tape drive (not shown) can reference a known datum that locates the storage tape 28, and more importantly, the data tracks embedded in the storage tape 28. Therefore, the base plate 102 serves both as an attachment means for the components disposed on its surface, and as a reference means to position the tape guide 70 and the auxiliary guide 100 relative to the single tape reel assembly 26.

The auxiliary guide 100 directs the storage tape 28 (FIG. 1) along an interior perimeter of the housing 98 and aids in aligning the storage tape 28 prior to its contact with the tape contact face 74. As such, the auxiliary guide 100 guides the storage tape 28 in its pathway to the tape guide 70. The auxiliary guide 100 may also include a top flange 110 and a bottom flange 112 that restrict the lateral motion of the storage tape 28. Optionally, the tape guide 70 could be disposed within the housing 98 and attached to the base plate 102 without the auxiliary guide 100 being present. However, as illustrated in FIG. 6, the auxiliary guide 100 is positioned in a corner 114 of base plate 102 and is sized to fit within the housing 98. The auxiliary guide 100 can assume a variety of forms and placements, and more than one auxiliary guide can be included. For example, FIG. 6 depicts a second auxiliary guide 116 located opposite the auxiliary guide 100. The second auxiliary guide 116 is a pin that may or may not include a top and/or bottom flange, and provides additional guidance adjacent the head access window 40.

Utilization of the base plate 102 is compatible with in-cartridge guiding. For example, the tape guide 70 can be mounted to the base plate 102 such that its vertical position is aligned with the single tape reel assembly 26 for smooth winding and unwinding, and thus improved alignment of the storage tape 28 (FIG. 1) relative to the tape drive (not shown). Additionally, the base plate 102 can be employed as a platform to include other features within the housing 98. Other components that could be added to the base plate 102 include pack arms, in-cartridge memory chips, idler rolls, and wrap pins. Finally, the hub 52 of the single tape reel assembly 26 could incorporate a journal bearing, such as a ball and sleeve, in a central bore therein. Consequently, the single tape reel assembly 26 rotates with reduced wobble, and therefore exhibits less initial lateral tape motion. An added benefit in employing the base plate 102 within the housing 98 is that the base plate 102 provides increased stiffness to the design resulting in improved drop test performance.

Magnetic media, including data storage tape, generally is abrasive. As the data storage tape 28 (FIG. 1) moves along the tape contact face 74 and the auxiliary guide 100, the data storage tape 28 contacts the components and can potentially abrade the surfaces. Consequently, the tape contact face 74 and the auxiliary guide 100 should be protected against wear imparted by the abrasive storage tape 28 media. Therefore, the tape contact face 74 and the auxiliary guide 100 are preferably manufactured from a durable material, such as metal, ceramic, or plastic. Examples of suitable materials for manufacturing the tape guide 70 and the auxiliary guide 100 include aluminum, steel, stainless steel, polyester, nylon and thermoplastics and thermoset plastics in general. The durable material that comprises the tape guide 70 and the auxiliary guide 100 is preferably coated at the contacting surfaces to be abrasion resistant. One preferred coating includes an electroless metal coating heat treated to a Rockwell hardness of at least C20.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A single reel data storage tape cartridge comprising:
a housing defining a tape access window;
a single tape reel assembly rotatably disposed within the housing, the single tape reel assembly including a hub;
a storage tape wrapped about the hub; and
an elongated tape guide having opposed ends and disposed within the housing adjacent the single tape reel assembly and opposite the tape access window;
wherein the tape guide defines a pathway of the storage tape from the single tape reel assembly to the tape access window.

2. The single reel data storage tape cartridge of claim 1, wherein the tape guide is removably coupled to the housing.

3. The single reel data storage tape cartridge of claim 1, wherein the tape guide is integrally formed by the housing.

4. The single reel data storage tape cartridge of claim 1, further comprising a supplemental guide disposed within the housing.

5. The single reel data storage tape cartridge of claim 1, further comprising a base plate disposed within the housing and maintaining the rape guide and the tape reel assembly.

6. The single reel data storage tape cartridge of claim 1, wherein the tape guide includes a top flange and a bottom flange that together restrict lateral motion of the storage tape.

7. The single reel data storage tape cartridge of claim 6, wherein the top and bottom flanges are adapted to restrict lateral motion of the storage tape to less than 300 micrometers.

8. The single reel data storage tape cartridge of claim 1, wherein the tape guide includes an arcuate back face positioned adjacent the single tape reel assembly.

9. The single reel data storage tape cartridge of claim 1, wherein the tape guide includes a longitudinally arcuate tape contact face.

10. The single reel data storage tape cartridge of claim 9, wherein the tape contact face includes an abrasion resistant coating.

11. The single reel data storage tape cartridge of claim 1, wherein the housing defines a front wall and a back wall, at least a portion of the tape access window being formed in the front wall, and further wherein the tape guide is positioned between the single tape reel assembly and the back wall.

12. The single reel data storage tape cartridge of claim 11, wherein the tape guide is positioned between a center of the single tape reel assembly and a center of the back wall.

13. The single reel data storage tape cartridge of claim 1, wherein the pathway of the storage tape is constant between the tape guide and the tape access window.

14. A method of using a single reel data storage tape cartridge and tape drive including a read/write head, the method comprising:
engaging the single reel data storage tape cartridge with the tape drive, wherein the single reel data storage tape cartridge includes a housing having a tape access window, a single tape reel assembly rotatably disposed within the housing, and a storage tape wound about the tape reel assembly;
articulating the storage tape along a tape path defined at least in part by a non-rotating tape guide disposed within the housing opposite the tape access window; and
driving the storage tape through the tape access window and into engagement with the read/write head;
wherein the tape guide defines a pathway of the storage tape from the tape reel assembly to the tape access window.

15. The method of claim 14, wherein engaging the single reel data storage tape cartridge with the tape drive includes the tape drive referencing a vertical datum defined by the tape guide and the tape reel assembly.

16. The method of claim 14, wherein articulating the storage tape along a tape path defined at least in part by a tape guide includes articulating the storage tape along a longitudinally arcuate tape contact face of the tape guide.

17. The method of claim 14, wherein articulating the storage tape along a tape path defined at least in part by a tape guide includes restricting lateral motion of the storage tape to less than approximately 300 micrometers.

18. The method of claim 14, wherein articulating the storage tape along a tape path defined at least in part by a tape guide includes articulating the storage tape along a path from the tape reel assembly, to and along the tape guide, and out the tape access window.

19. The method of claim 18, wherein the storage tape is further articulated along an auxiliary tape guide within the tape cartridge.

20. The method of claim 14, wherein articulating the storage tape along a tape path defined at least in part by a tape guide includes articulating the storage tape along a path from the tape reel assembly, away from the tape access window, to and along the tape guide, and out the tape access window.

21. The method of claim 14, whein articulating the storage tape along a tape path defined at least in part by a tape guide includes articulating the storage tape along a path that does not extend across the tape access window.

* * * * *